(12) United States Patent
Rhee

(10) Patent No.: US 12,512,198 B2
(45) Date of Patent: Dec. 30, 2025

(54) DIGITAL THERAPEUTICS MANAGEMENT SYSTEM AND METHOD OF OPERATING THE SAME

(71) Applicant: ODN Co., Ltd, Seoul (KR)

(72) Inventor: Sang Youl Rhee, Seoul (KR)

(73) Assignee: ODN Co., Ltd, Seoul (KR)

( * ) Notice: Subject to any disclaimer, the term of this patent is extended or adjusted under 35 U.S.C. 154(b) by 285 days.

(21) Appl. No.: 18/201,948

(22) Filed: May 25, 2023

(65) Prior Publication Data

US 2023/0402142 A1 Dec. 14, 2023

(30) Foreign Application Priority Data

Jun. 9, 2022 (KR) .......................... 10-2022-0070264

(51) Int. Cl.
*G16H 20/00* (2018.01)
*G16H 10/60* (2018.01)
*G16H 40/67* (2018.01)

(52) U.S. Cl.
CPC .............. *G16H 20/00* (2018.01); *G16H 10/60* (2018.01); *G16H 40/67* (2018.01)

(58) Field of Classification Search
CPC ........ G16H 20/00; G16H 40/67; G16H 10/60; G16H 40/20; G16H 20/10; G16H 15/00; G16H 50/70; G16Y 10/60; G16Y 40/10; G16Y 20/40
See application file for complete search history.

(56) References Cited

U.S. PATENT DOCUMENTS

| 2021/0057057 A1* | 2/2021 | Chin ....................... G06N 20/00 |
| 2022/0028528 A1* | 1/2022 | Paull ....................... G16H 20/70 |

FOREIGN PATENT DOCUMENTS

| KR | 10-2021-0086246 A | 7/2021 | |
| KR | 10-2021-0105379 A | 8/2021 | |
| KR | 10-2022-0034806 A | 3/2022 | |
| WO | WO-2022215764 A1 * | 10/2022 | ............ A61B 5/4088 |
| WO | WO-2022250463 A1 * | 12/2022 | ............. G16H 10/60 |
| WO | WO-2023042971 A1 * | 3/2023 | |

* cited by examiner

*Primary Examiner* — Marc Q Jimenez
*Assistant Examiner* — Alexis K. Van Duzer
(74) *Attorney, Agent, or Firm* — Bridgeway IP Law Group, PLLC; Sang Ho Lee; Hyun Woo Shin

(57) ABSTRACT

The present disclosure relates to a digital therapeutics management system and a method of operating the same. The digital therapeutics management system according to one embodiment includes an information receiver for receiving prescription information of a user including at least one digital therapeutics from a terminal of a medical institution; an execution result manager for providing the prescription information to a terminal of the user, receiving execution result information corresponding to the provided prescription information from the terminal of the user, and providing the received execution result information to the terminal of the medical institution; and a record manager for receiving treatment result information corresponding to the execution result information from the terminal of the medical institution and updating the received treatment result information to an electronic medical record (EMR) database of the medical institution.

16 Claims, 9 Drawing Sheets

【FIG. 1】
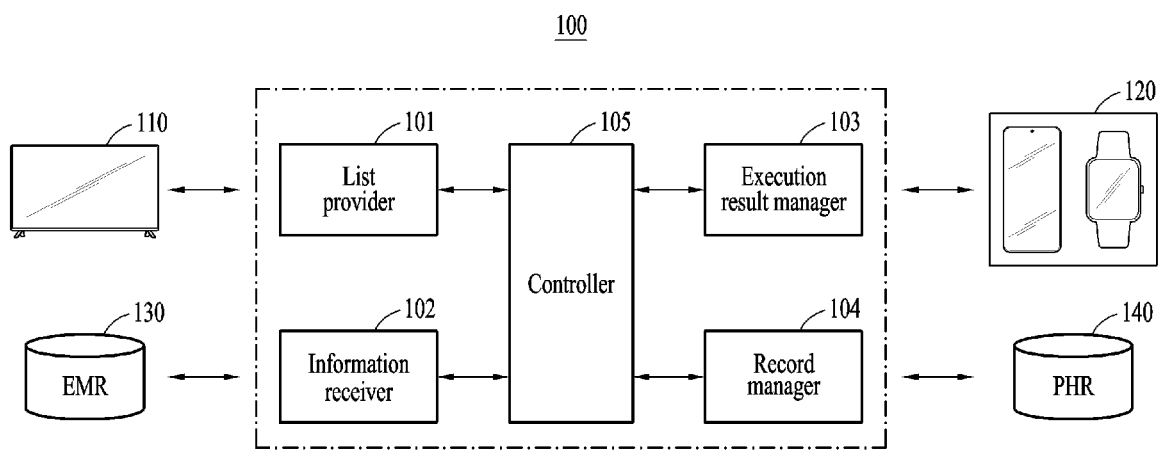

| | Blood sugar |
|---|---|
| 1 Month(04.28~05.27) | Target range |
| Pre-meal average  134 | 80~130 |
| Post-meal average  – | 90~160 |
| Total average  134 | |

May 25, 2019 (Saturday)

135
Target range / Before bedtime

↳ Blood sugar is in target range before bedtime

May 20, 2019 (Monday)

120
Target range / Before meal

[FIG. 2B]

【FIG. 2C】
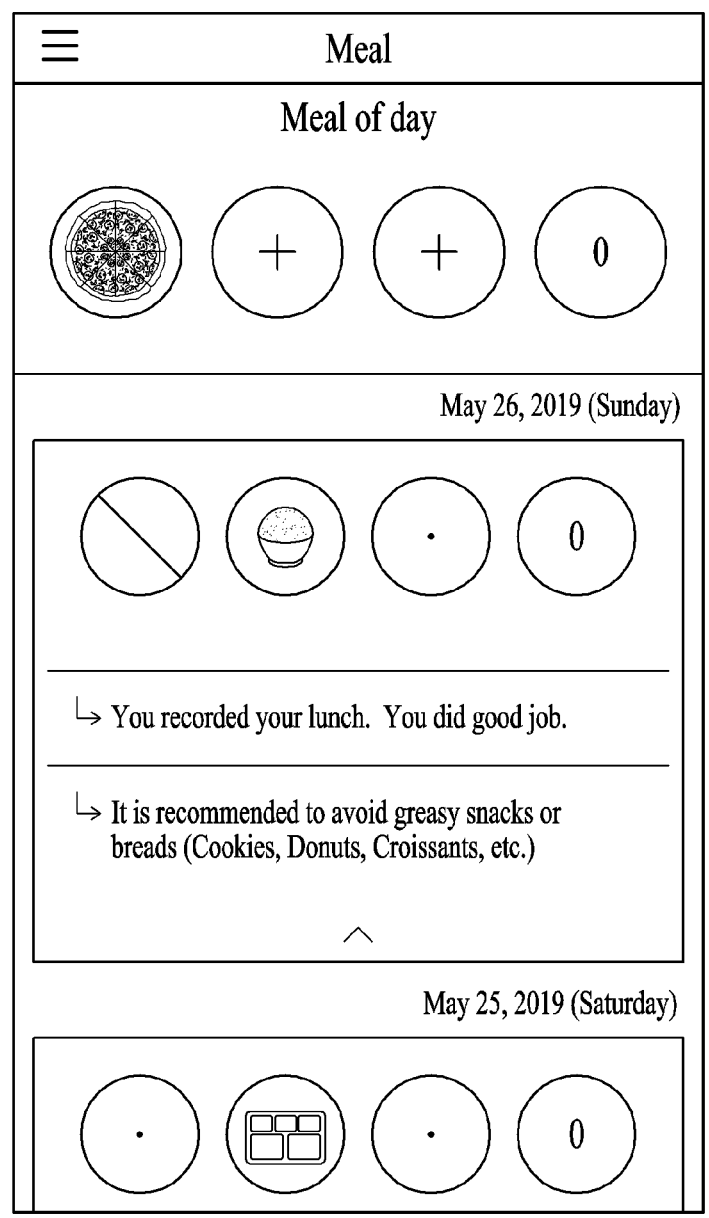

[FIG. 2D]
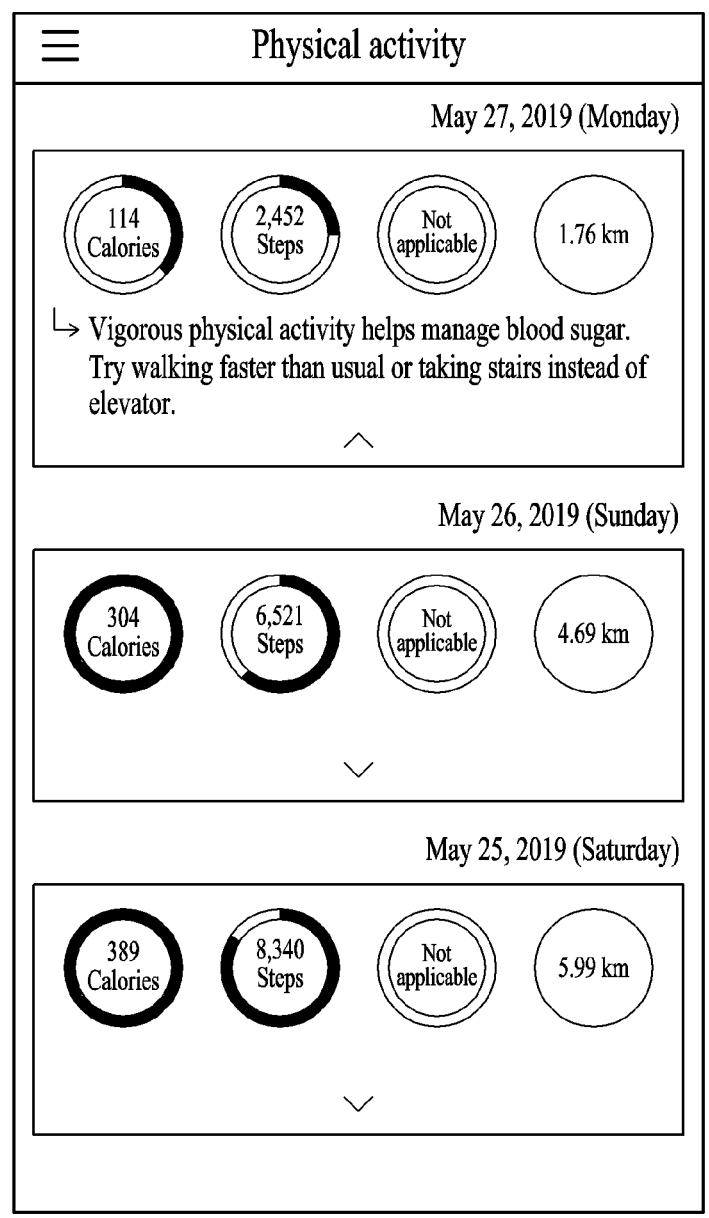

[FIG. 3A]
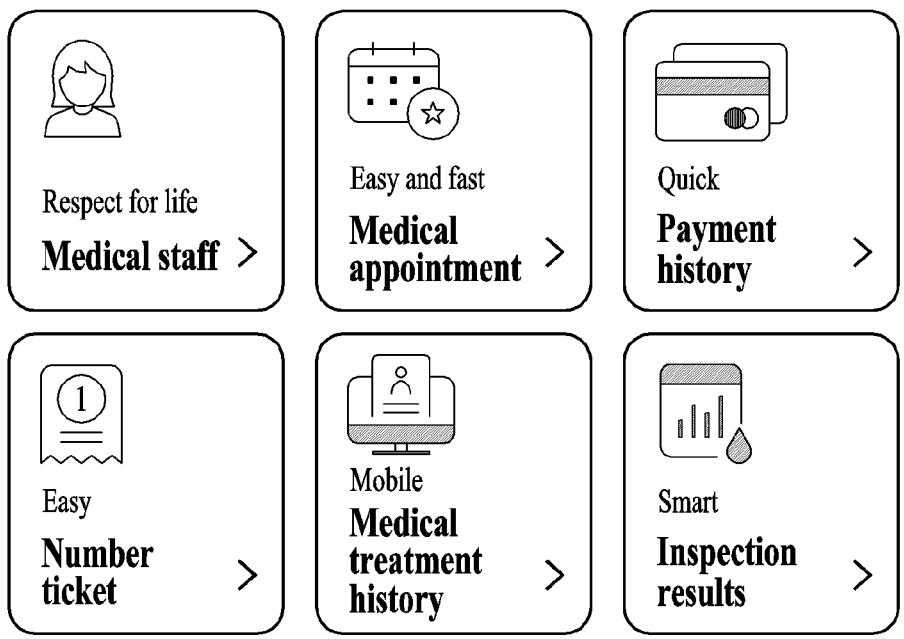

[FIG. 3B]
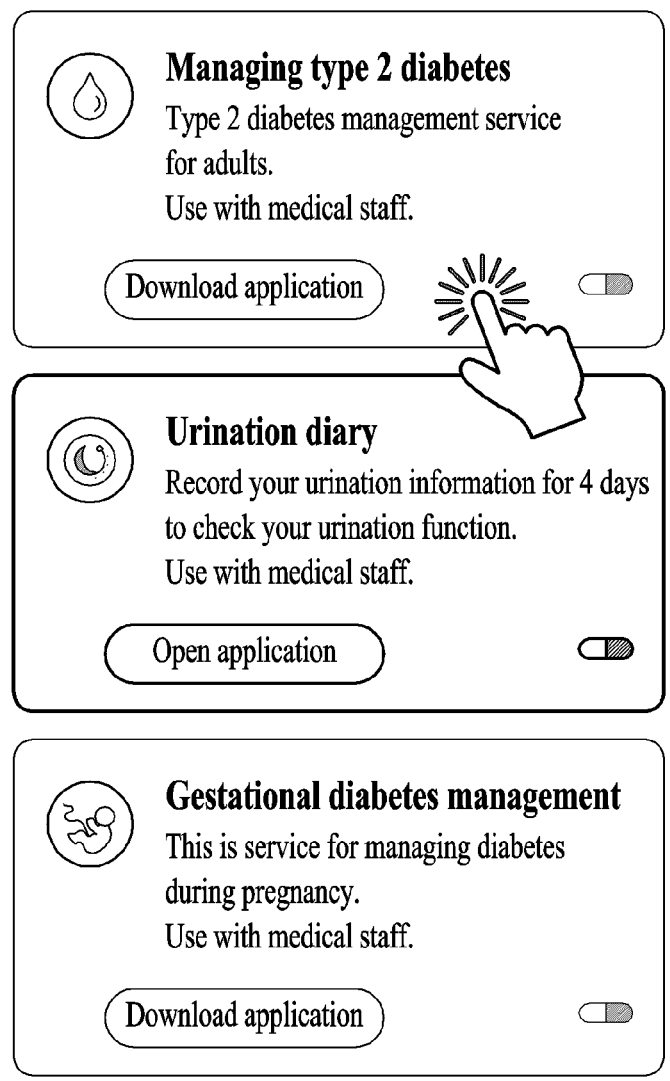

[FIG.3C]
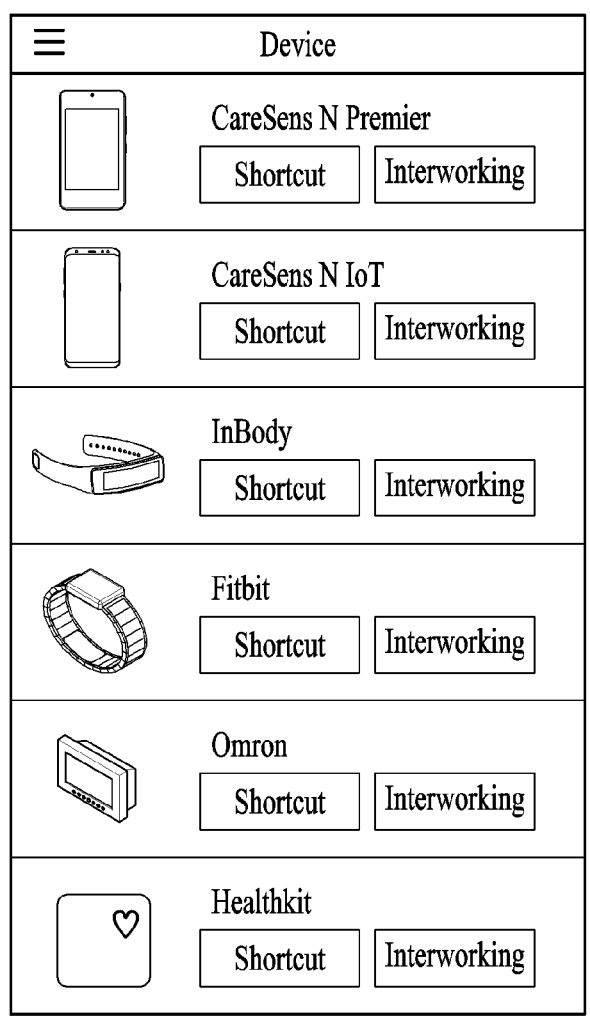

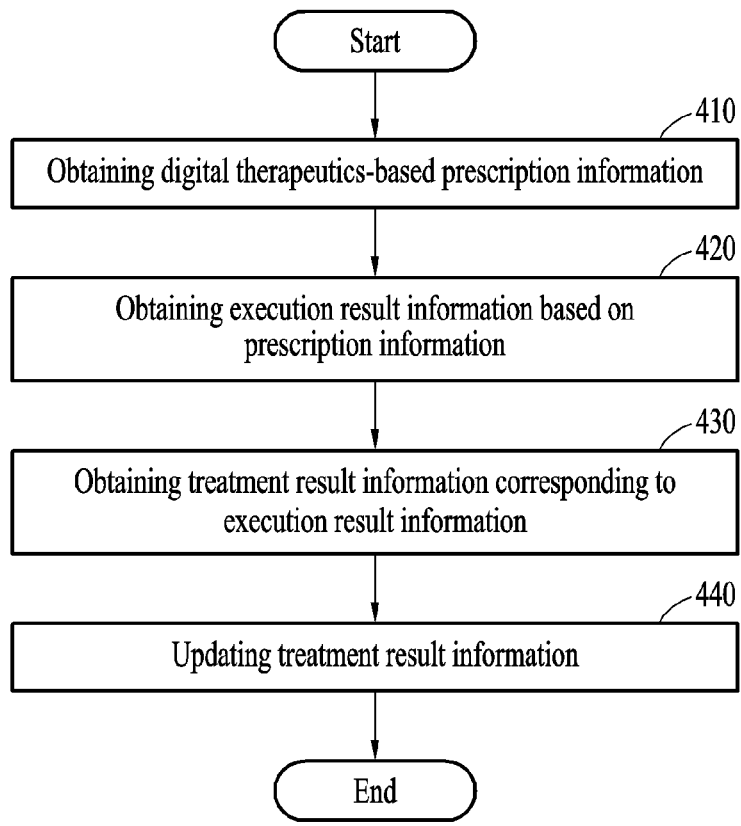

DIGITAL THERAPEUTICS MANAGEMENT SYSTEM AND METHOD OF OPERATING THE SAME

CROSS-REFERENCE TO RELATED APPLICATION

This application claims priority to Korean Patent Application No. 10-2022-0070264, filed on Jun. 9, 2022, in the Korean Intellectual Property Office, the disclosure of which is incorporated herein by reference.

STATEMENT REGARDING SPONSORED RESEARCH OR DEVELOPMENT

The information pertains to the National R&D Project supporting the present disclosure. The project unique number is 1425182506, and the detailed project unique number is 00303873. The supporting ministry is the Ministry of SMEs and Startups, and the research management agency is the Korea Technology and Information Promotion Agency for SMEs (TIPA). The research program name is the Technology Incubator Program for Startup (TIPS), and the research project name is the ICT-based Personalized Metabolic Disease Management Program (Digital Therapeutics). The project is performed by ODN Co., Ltd., and the research period spans from Nov. 1, 2023, to Oct. 31, 2025.

BACKGROUND OF THE DISCLOSURE

Field of the Disclosure

The present disclosure relates to a digital therapeutics management system and a method of operating the same, and more particularly, to a technical idea for a digital therapeutics platform that prescribes and manages digital therapeutics in connection with medical institutions.

Description of the Related Art

Recently, problems such as an increase in chronic diseases due to aging, an increase in the social burden of health insurance finance, and limitation in medical accessibility have emerged. As a solution to these problems, digital therapeutics (DTx) are attracting attention.

Digital therapeutics may be defined as a software medical device that provides evidence-based therapeutic intervention to patients to prevent, manage, and treat medical disorders or diseases. Since the digital therapeutics are software-based treatment, compared to conventional therapies, the digital therapeutics have the advantages of non-toxic and few side effects. In addition, unlike general medicines, the digital therapeutics do not require manufacturing, transportation, and storage, so the digital therapeutics may be supplied in large quantities at low cost, thereby reducing medical costs. In addition, in the case of digital therapeutics, since a small number of doctors may manage a large number of patients without physical and temporal limitations, problems such as increased burden on health insurance finance, lack of medical supply, and regional inequality in health care may be partially solved.

As digital therapeutics is expected to play a key role in future health care services, the demand for digital therapeutics is steadily increasing. However, a conventional system has a problem in that prescription and management of digital therapeutics are not efficient due to insufficient linkage between a pre-established medical system and users.

RELATED ART DOCUMENTS

Patent Documents

Korean Patent Application Publication No. 10-2022-0034806, "ADAPTIVE INTERVENTION FOR GASTROINTESTINAL HEALTH CONDITIONS"

SUMMARY OF THE DISCLOSURE

Therefore, the present disclosure has been made in view of the above problems, and it is an object of the present disclosure to provide a digital therapeutics management system capable of providing high-quality digital therapeutics optimized for users by linking various health information of the users with medical records of medical institutions, and a method of operating the digital therapeutics management system.

It is another object of the present disclosure to provide a digital therapeutics management system capable of more accurately judging treatment results based on user feedback on prescribed digital therapeutics, and a method of operating the digital therapeutics management system.

It is yet another object of the present disclosure to provide a digital therapeutics management system capable of more easily managing users' medical records related to digital therapeutics by simply updating by linking with an existing medical record database, and a method of operating the digital therapeutics management system.

In accordance with one aspect of the present disclosure, provided is a digital therapeutics management system including an information receiver for receiving prescription information of a user including at least one digital therapeutics from a terminal of a medical institution; an execution result manager for providing the prescription information to a terminal of the user, receiving execution result information corresponding to the provided prescription information from the terminal of the user, and providing the received execution result information to the terminal of the medical institution; and a record manager for receiving treatment result information corresponding to the execution result information from the terminal of the medical institution and updating the received treatment result information to an electronic medical record (EMR) database of the medical institution.

According to one aspect of the present disclosure, the digital therapeutics management system may be interworked with the terminal of the medical institution and the terminal of the user through at least one of an application service and a web service for prescription and management of digital therapeutics.

According to one aspect of the present disclosure, the terminal of the user may collect, as the execution result information, at least one of data input by the user and bio-signal data of the user in response to the provided prescription information.

According to one aspect of the present disclosure, the data input by the user may include at least one of the number of executions, execution time, and execution strength of digital therapeutics corresponding to the prescription information.

According to one aspect of the present disclosure, the bio-signal data of the user may be monitored through at least one of a smart terminal and IoT terminal of the user and may include at least one of blood pressure, blood sugar, body temperature, heart rate, travel distance, and step count of the user.

According to one aspect of the present disclosure, the record manager may update the received treatment result information to a personal record database that collects a personal health record (PHR) of the user.

According to one aspect of the present disclosure, the treatment result information may include at least one of the prescription information, the execution record information, comment information of a medical staff according to the execution record information, and authentication information of the medical staff.

According to one aspect of the present disclosure, the digital therapeutics management system may further include a list provider for providing first digital therapeutics list capable of being prescribed in the medical institution to the terminal of the medical institution.

According to one aspect of the present disclosure, the information receiver may receive the prescription information including at least one digital therapeutics among a plurality of digital therapeutics included in the first digital therapeutics list from the terminal of the medical institution.

According to one aspect of the present disclosure, the list provider may receive medical data about the user from the terminal of the medical institution, receive prescription history big data of digital therapeutics from the electronic medical record database, extract a second digital therapeutics list from the first digital therapeutics list based on the received medical data and the prescription history big data, and provide the extracted second digital therapeutics list to the terminal of the medical institution.

According to one aspect of the present disclosure, the information receiver may receive the prescription information including at least one digital therapeutics among the second digital therapeutics list from the terminal of the medical institution.

In accordance with another aspect of the present disclosure, provided is a method of operating a digital therapeutics management system, the method including receiving, by an information receiver, prescription information of a user including at least one digital therapeutics from a terminal of a medical institution; providing, by an execution result manager, the prescription information to a terminal of the user, receiving execution result information corresponding to the provided prescription information from the terminal of the user, and providing the received execution result information to the terminal of the medical institution; and receiving, by a record manager, treatment result information corresponding to the execution result information from the terminal of the medical institution and updating the received treatment result information to an electronic medical record (EMR) database of the medical institution.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram showing a digital therapeutics management system according to one embodiment;

FIGS. 2A to 2D are diagrams showing examples of collecting execution result information corresponding to prescription information in a digital therapeutics management system according to one embodiment;

FIGS. 3A to 3C are diagrams for explaining dedicated application services interworked with a digital therapeutics management system according to one embodiment; and FIG. 4 is a flowchart for explaining a method of operating a digital therapeutics management system according to one embodiment.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

It should be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

FIG. 1 is a block diagram showing a digital therapeutics management system according to one embodiment.

Referring to FIG. 1, a digital therapeutics management system 100 according to one embodiment (i.e., digital therapeutics platform) may provide high-quality digital therapeutics optimized for users by linking various health information of the users with medical records of medical institutions.

In addition, the digital therapeutics management system 100 may judge treatment results more accurately based on user feedback on prescribed digital therapeutics.

In addition, the digital therapeutics management system 100 may manage users' medical records related to digital therapeutics more easily by simply updating by linking with an existing medical record database.

Accordingly, the digital therapeutics management system 100 may include a list provider 101, an information receiver 102, an execution result manager 103, and a record manager 104.

In addition, the digital therapeutics management system 100 may further include a controller 105 for controlling and managing transmission and reception of information (or data) between each of the list provider 101, the information receiver 102, the execution result manager 103, and the record manager 104; a medical institution terminal 110; a user terminal 120; and an electronic medical record (EMR) database 130 and personal record database 140 of a medical institution. The controller 105 may have a separate communication means for communication with each of the medical institution terminal 110, the user terminal 120, the electronic medical record database 130, and the personal record database 140.

For example, the medical institution may include at least one of a primary hospital, a secondary hospital, and a tertiary hospital, the medical institution terminal 110 may include at least one of a personal computer (PC) and smart terminal possessed by medical staff (e.g., doctors and nurses, etc.) belonging to the medical institution, and the user terminal 120 may include at least one of a PC, smart terminal, and IoT terminal possessed by a user, without being limited thereto. The medical institution terminal 110 and the user terminal 120 may further include a separately certified digital treatment device providing functions related to digital therapeutics.

In addition, as the user terminal 120, the IoT terminal may include a wearable device worn by a user, and may be interworked with the digital therapeutics management system 100 through direct communication or indirect communication through a smart terminal.

According to one aspect of the present disclosure, each of the medical institution terminal 110 and the user terminal 120 may be interworked with the digital therapeutics management system 100 through at least one of an application service and a web service that are separately constructed for prescription and management of digital therapeutics. Here, the at least one service may provide at least one of a medical institution-dedicated service and an individual user-dedicated service.

The electronic medical record database 130 is a database that collects and manages EMR data of a medical institution, and may be provided in a separate medical data server provided in the medical institution.

In addition, the personal record database 140 is a database that collects a personal health record (PHR) of a user, and may be provided in the digital therapeutics management system 100 or a separate health record server.

According to one aspect of the present disclosure, the controller 105 may provide a registration function for the medical institution terminal 110 and the user terminal 120 through at least one of an application service and a web service.

Specifically, the controller 105 may perform an authentication procedure upon receiving a permission request signal for use of an application service and/or a web service from at least one of the medical institution terminal 110 and the user terminal 120. Based on the result of performing the authentication procedure, the controller 105 may register at least one terminal and grant usage authority.

In addition, when at least one terminal providing a permission request signal is a digital treatment device, the controller 105 may map the digital treatment device with at least one of an EDI code and a non-benefit code.

In addition, the controller 105 may search for digital therapeutics usable in the digital therapeutics management system 100 according to a request from the registered medical institution terminal 110. The controller 105 may register at least one digital therapeutics derived according to the search result as digital therapeutics usable in a medical institution, and may map each of the registered digital therapeutics with a hospital prescription (fee) code.

The information receiver 102 according to one embodiment may receive user prescription information including at least one digital therapeutics from the medical institution terminal 110.

According to one aspect of the present disclosure, the list provider 101 may provide the first digital therapeutics list capable of being prescribed in the medical institution to the medical institution terminal, and the information receiver 102 may receive prescription information including at least one digital therapeutics among a plurality of digital therapeutics included in the first digital therapeutics list from the medical institution terminal 110.

That is, the list provider 101 may pre-register the first digital therapeutics list capable of being prescribed in the medical institution. When a user visits the medical institution, the list provider 101 may provide the registered first digital therapeutics list to a pre-registered terminal of a medical staff treating the user, that is, the medical institution terminal 110. The medical staff may generate prescription information including at least one digital therapeutics among a plurality of digital therapeutics included in the first digital therapeutics list based on the user's treatment results, and may provide the generated prescription information to the information receiver 102 through the medical institution terminal 110.

According to one aspect of the present disclosure, the list provider 101 may receive medical data about the user from the medical institution terminal 110, may extract prescription history big data of digital therapeutics from the electronic medical record database 130, and may extract a second digital therapeutics list from the first digital therapeutics list based on the received medical data and prescription history big data and provide the extracted second digital therapeutics to the medical institution terminal 110.

In addition, the information receiver 102 may receive prescription information including at least one digital therapeutics in the second digital therapeutics list from the medical institution terminal.

For example, medical data on a user may include at least one of symptom information of a user who has visited a medical institution and test result data and pathological history data of a user monitored by a medical institution. Here, the test result data may include at least one of blood test result data and heart rate test data, without being limited thereto. The test result data may include all tests that may be performed on patients in a medical institution.

In addition, the prescription history big data may include information on the prescription history of digital therapeutics for each symptom of a number of users. In addition to a medical institution visited by a user, the information receiver 102 may collect prescription history big data by collecting prescription history information from a plurality of medical institutions interworked with the digital therapeutics management system 100.

That is, the list provider 101 may receive medical data about a user and prescription history big data, match the prescription history big data and the medical data about the user, extract the second digital therapeutics list including at least one digital therapeutics that matches user's medical data in the first digital therapeutics list based on the matching result of medical data, and provide the extracted second digital therapeutics list to the medical institution terminal 110.

For example, the list provider 101 may include a list recommendation algorithm based on deep learning, collect prescription history big data at predetermined intervals, perform machine learning of the list recommendation algorithm using the collected prescription history big data as learning data, and output a second digital therapeutics list by inputting medical data about a user to the learned list recommendation algorithm.

That is, the list provider 101 may recommend a second digital therapeutics list matching user's current symptoms to a medical staff based on the prescription history big data and the medical data about the user.

According to one aspect of the present disclosure, the information receiver 102 may receive text data according to diagnosis of a medical staff in the process of treating a user through the medical institution terminal 110. The list provider 101 may extract feature data using a deep learning-based feature extraction algorithm that uses received text data as an input, extract a third digital therapeutics list from at least one of the first digital therapeutics list and the second digital therapeutics list based on the extracted feature data, and provide the extracted third digital therapeutics list to the medical institution terminal 110.

Specifically, the list provider 101 may receive text data about symptoms entered by a medical staff in the process of treating a user, may analyze the received text unstructured data and extract terms (expressions) for a chief complaint as feature data, and may provide a third digital therapeutics list corresponding to the extracted feature data to the medical institution terminal 110. The medical institution terminal 110 may visualize the third digital therapeutics list to a medical staff during treatment.

That is, the list provider 101 may extract the third digital therapeutics list including at least one digital therapeutics in the second digital therapeutics list based on prescription history big data, medical data about a user, and text data according to treatment of a medical staff and may provide the third digital therapeutics list to the medical staff through the medical institution terminal 110 to improve convenience of prescribing digital therapeutics and induce prescription of digital therapeutics optimized for the user.

The execution result manager 103 according to one embodiment may provide prescription information to the user terminal 120, receive execution result information corresponding to the provided prescription information from the user terminal 120, and provide the received execution result information to the medical institution terminal 110.

According to one aspect of the present disclosure, the user terminal 120 may collect at least one of data input by a user and bio-signal data of the user in response to the prescription information provided from the execution result manager 103 as execution result information.

For example, the data input by a user may include at least one of the number of executions, execution time, and execution strength of digital therapeutics corresponding to prescription information.

In addition, the bio-signal data of a user may be monitored through at least one user terminal 120 of a smart terminal and IoT terminal of the user, and may include at least one of blood pressure, blood sugar, body temperature, heart rate, travel distance, and step count of the user. For this function, the user terminal 120 may include a plurality of biometric sensors.

As a specific example, the user terminal 120 may continuously monitor the user's heart rate according to the use of digital therapeutics using a photoplethysmography (PPG) sensor, and may provide monitoring results to the execution result manager 103 through a network.

In addition, the user terminal 120 may analyze motion and gait information of a user based on data collected using a 3-axis acceleration sensor and a 3-axis angular velocity sensor, derive travel distance information and step count information of the user based on the analysis result of the user's motion and gait information, and provide the derived travel distance information and step count information to the execution result manager 103 through a network.

The record manager 104 according to one embodiment may receive treatment result information corresponding to execution result information from the medical institution terminal 110 and update the received treatment result information to the electronic medical record database 130.

According to one aspect of the present disclosure, the record manager 104 may update the received treatment result information to the personal record database 140.

For example, the treatment result information may include at least one of prescription information, execution record information, medical result information of a medical staff according to the execution record information, and authentication information of a medical staff.

In addition, the medical result information of a medical staff may include evaluation information on digital therapeutics prescribed to a user. Here, the evaluation information may be information digitized in a preset format (e.g., information digitized from 1 to 10).

In addition, the controller 105 may claim medical expenses for the corresponding user to the Health Insurance Review & Assessment Service based on the treatment result information.

In addition, the list provider 101 may collect numerical values of evaluation information according to treatment result information from medical staffs belonging to a medical institution, perform evaluation on each of a plurality of digital therapeutics stored in the electronic medical record database 130 based on the numerical values of the collected evaluation information, and extract at least one of the second digital therapeutics list and the third digital therapeutics list by using the evaluation result.

For example, the list provider 101 may collect and average numerical values of evaluation information of each of a plurality of digital therapeutics and extract digital therapeutics having an averaged numerical value equal to or less than a preset threshold score. When at least one of the second digital therapeutics list and the third digital therapeutics list is extracted, the list provider 101 may configure a list excluding digital therapeutics having a predetermined threshold score or less.

FIGS. 2A to 2D are diagrams showing examples of collecting execution result information corresponding to prescription information in a digital therapeutics management system according to one embodiment.

Referring to FIGS. 2A to 2D, drawing symbol 210 shows an example of collecting 'blood sugar information' of a user in the digital therapeutics management system, and drawing symbol 220 shows an example of collecting 'blood pressure information' of a user in the digital therapeutics management system.

In addition, drawing symbol 230 shows an example of collecting 'meal information' of a user in the digital therapeutics management system, and drawing symbol 240 shows an example of collecting 'activity amount information' of a user in the digital therapeutics management system.

Specifically, the digital therapeutics management system may provide prescription information including digital therapeutics to a user who visits a medical institution and receives treatment.

The user may access a dedicated application or web using a user terminal and check the provided prescription information, and may provide execution result information to the digital therapeutics management system by inputting execution result information according to execution of the prescribed digital therapeutics into the dedicated application or web as shown in drawing symbols 210 to 240.

According to drawing symbol 210, a user may provide 'blood sugar information' as execution result information through monitoring using a user terminal or direct input by the user.

According to drawing symbol 220, a user may provide 'blood pressure information' as execution result information through monitoring using a user terminal or direct input by the user.

According to drawing symbol 230, a user may provide 'meal amount information' as execution result information through direct input by the user.

According to drawing symbol 240, a user may provide 'activity amount information' as execution result information through monitoring using a user terminal or direct input by the user. Here, the activity amount information may include calorie consumption information calculated based on at least one of travel distance information and step count information.

FIGS. 3A to 3C are diagrams for explaining dedicated application services interworked with a digital therapeutics management system according to one embodiment.

Referring to FIGS. 3A to 3C, drawing symbols 310 to 330 show examples of additional functions of dedicated applications interworked with the digital therapeutics management system.

The digital therapeutics management system may prescribe digital therapeutics to a user through a dedicated application or web, receive execution result information on the prescribed digital therapeutics as feedback, and manage medical treatment information of the user accordingly.

In addition to the functions of prescribing and managing digital therapeutics described above, the dedicated application or web of the digital therapeutics management system may provide additional functions to the user.

Specifically, according to drawing symbol 310, the dedicated application or web of the digital therapeutics management system may provide a function of making a reservation for a medical institution, a function of receiving a medical treatment, a function of paying medical expenses, a function of checking medical treatment details, and a function of checking test results (i.e., prescription information).

According to drawing symbol 320, the dedicated application or web of the digital therapeutics management system may provide additional information (e.g., type 2 diabetes management, urination diary, gestational diabetes management, etc.) for user health management, and may provide the additional information for health management through association with a separate additional application.

According to drawing symbol 330, the dedicated application or web of the digital therapeutics management system may be interworked with an IoT terminal of a user.

FIG. 4 is a flowchart for explaining a method of operating a digital therapeutics management system according to one embodiment.

That is, FIG. 4 shows an example of a method of operating the digital therapeutics management system according to one embodiment described with reference to FIGS. 1 to 3C. In the following description with reference to FIG. 4, descriptions overlapping those of FIGS. 1 to 3C are omitted.

Referring to FIG. 4, in step 410, an information receiver may receive prescription information of a user including at least one digital therapeutics from a medical institution terminal.

According to one aspect of the present disclosure, in step 410, the list provider may provide first digital therapeutics list capable of being prescribed in the medical institution to the medical institution terminal, and an information receiver may receive prescription information including at least one digital therapeutics among a plurality of digital therapeutics included in the first digital therapeutics list from the medical institution terminal.

According to one aspect of the present disclosure, in step 410, the list provider may receive medical data about a user from the medical institution terminal, receive prescription history big data of digital therapeutics from an electronic medical record (EMR) database, extract a second digital therapeutics list from the first digital therapeutics list based on the received medical data and the prescription history big data, and provide the extracted second digital therapeutics list to the medical institution terminal. The information receiver may receive prescription information including at least one digital therapeutics among the second digital therapeutics list from the medical institution terminal.

Next, in step 420, an execution result manager may provide the prescription information to the user terminal, receive execution result information corresponding to the provided prescription information from the user terminal, and provide the received execution result information to the medical institution terminal.

According to one aspect of the present disclosure, the digital therapeutics management system may be interworked with the medical institution terminal and the user terminal through at least one of an application service and a web service for prescription and management of digital therapeutics.

In addition, the user terminal may collect at least one of data input by the user and bio-signal data of the user in response to the provided prescription information as execution result information.

For example, the data input by the user may include at least one of the number of executions, execution time, and execution strength of digital therapeutics corresponding to the prescription information.

In addition, the bio-signal data of the user may be monitored through at least one of a smart terminal and IoT terminal of the user, and may include at least one of blood pressure, blood sugar, body temperature, heart rate, travel distance, and step count of the user.

Next, in step 430, the record manager may receive treatment result information corresponding to the execution result information from the medical institution terminal.

Next, in step 440, the record manager may update the received treatment result information to an electronic medical record (EMR) database of the medical institution.

According to one aspect of the present disclosure, in step 440, the record manager may update the received treatment result information to a personal record database for collecting a personal health record (PHR).

For example, the treatment result information may include at least one of the prescription information, the execution record information, comment information of a medical staff according to the execution record information, and authentication information of the medical staff.

Accordingly, when the present disclosure is used, high-quality digital therapeutics optimized for users may be provided by linking various health information of the users with medical records of medical institutions.

In addition, when the present disclosure is used, treatment results may be judged more accurately based on user feedback on prescribed digital therapeutics.

In addition, when the present disclosure is used, users' medical records related to digital therapeutics may be managed more easily by simply updating by linking with an existing medical record database.

According to one embodiment, the present disclosure can provide high-quality digital therapeutics optimized for users by linking various health information of the users with medical records of medical institutions.

According to one embodiment, the present disclosure can judge treatment results more accurately based on user feedback on prescribed digital therapies.

According to one embodiment, the present disclosure can manage users' medical records related to digital therapeutics more easily by simply updating by linking with an existing medical record database.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

| | |
|---|---|
| 100: | DIGITAL THERAPEUTICS MANAGEMENT SYSTEM |
| 101: | LIST PROVIDER |
| 102: | INFORMATION RECEIVER |
| 103: | EXECUTION RESULT MANAGER |
| 104: | RECORD MANAGER |
| 110: | TERMINAL OF MEDICAL INSTITUTION |
| 120: | TERMINAL OF USER |
| 130: | ELECTRONIC MEDICAL RECORD DATABASE |
| 140: | PERSONAL RECORD DATABASE |

What is claimed is:

1. A digital therapeutics management system comprising:
a list providing processor configured to:
provide a first digital therapeutics list including at least one digital therapeutic prescribable by a medical institution to a medical institution terminal,
receive medical data of a user from the medical institution terminal,
receive prescription history big data of digital therapeutics from an electronic medical record (EMR) database,
output a second digital therapeutics list, including the at least one digital therapeutic from the first digital therapeutics list that matches the medical data of the user based on a matching result between the medical data of the user and the prescription history big data of digital therapeutics by applying a deep learning-based list recommendation algorithm that is trained using the prescription history big data collected at predetermined intervals,
receive unstructured text data according to diagnosis of a medical staff in a process of treating the user through the medical institution terminal,
extract a feature data from the unstructured text data by applying a deep learning-based feature extraction algorithm,
extract a third digital therapeutics list including the at least one digital therapeutic in the second digital therapeutics list based on the extracted feature data in addition to the prescription history big data of digital therapeutics and the medical data of the user, and
provide the second digital therapeutics list and the third digital therapeutics list to the medical institution terminal;
an information receiving processor configured to receive prescription information of the user comprising the at least one digital therapeutic from the medical institution terminal;
an execution result managing processor configured to:
provide the prescription information to a user terminal
receive execution result information corresponding to the provided prescription information from the user terminal, wherein the execution result information includes bio-signal data continuously monitored and collected by a plurality of biometric sensors included in the user terminal, and
provide the received execution result information to the medical institution terminal; and
a record managing processor configured to receive treatment result information corresponding to the execution result information from the medical institution terminal and update the received treatment result information on the electronic medical record (EMR) database and a personal health record (PHR) database of the medical institution, wherein the digital therapeutics management system is interworked with the medical institution terminal and the user terminal through at least one of an application service and an IoT-enabled web service.

2. The digital therapeutics management system according to claim 1, wherein the user terminal collects, as the execution result information, at least one of data input by the user and the bio-signal data of the user in response to the provided prescription information.

3. The digital therapeutics management system according to claim 2, wherein the data input by the user comprises at least one of the number of executions, execution time, and execution strength of digital therapeutics corresponding to the prescription information.

4. The digital therapeutics management system according to claim 2,
wherein the bio-signal data of the user is monitored through at least one of a smart terminal and IoT terminal of the user and comprises at least one of blood pressure, blood sugar, body temperature, heart rate, travel distance, and step count of the user, and
wherein the plurality of biometric sensors includes photoplethysmography sensor configured to continuously monitor the heart rate, and 3-axis acceleration sensor and 3-axis angular velocity sensor, each configured to derive the travel distance and the step count.

5. The digital therapeutics management system according to claim 1, wherein the treatment result information comprises at least one of the prescription information, an execution record information, comment information of the medical staff according to the execution record information, and authentication information of the medical staff.

6. A method of operating a digital therapeutics management system comprising:
providing, by a list providing processor, a first digital therapeutics list including at least one digital therapeutic prescribable by a medical institution to a medical institution terminal;
receiving, by the list providing processor, medical data of a user from the medical institution terminal;
receiving, by the list providing processor, prescription history big data of digital therapeutics from an electronic medical record (EMR) database;
receiving, by the list providing processor, prescription history big data of digital therapeutics from an electronic medical record (EMR) database;
outputting, by the list providing processor, a second digital therapeutics list including the at least one digital therapeutic from the first digital therapeutics list that matches the medical data of the user based on a matching result between the medical data of the user and the prescription history big data of digital therapeutics by applying a deep learning-based list recommendation algorithm that is trained using the prescription history big data collected at predetermined intervals;
receiving, by the list providing processor, prescription history big data of digital therapeutics from an electronic medical record (EMR) database;
outputting, by the list providing processor, a second digital therapeutics list including the at least one digital therapeutic from the first digital therapeutics list that matches the medical data of the user based on a matching result between the medical data of the user and the prescription history big data of digital therapeutics by applying a deep learning-based list recommendation algorithm that is trained using the prescription history big data collected at predetermined intervals;

receiving, by the list providing processor, unstructured text data according to diagnosis of a medical staff in a process of treating the user through the medical institution terminal;

extracting, by the list providing processor, a feature data from the unstructured text data by applying a deep learning-based feature extraction algorithm;

extracting, by the list providing processor, a third digital therapeutics list including the at least one digital therapeutic in the second digital therapeutics list based on the extracted feature data in addition to the prescription history big data of digital therapeutics and the medical data of the user;

providing, by the list providing processor, the second digital therapeutics list and the third digital therapeutics list to the medical institution terminal;

receiving, by an information receiving processor, prescription information of the user comprising the at least one digital therapeutic from the medical institution terminal, providing, by an execution result managing processor, the prescription information to a user terminal, receiving execution result information corresponding to the provided prescription information for the user terminal, wherein the execution result information includes bio-signal data continuously monitored and collected by a plurality of biometric sensors included in the user terminal, and providing the received execution result information to the medical institution terminal; and receiving, by a record managing processor, treatment result information corresponding to the execution result information from the medical institution terminal and updating the received treatment result information on the electronic medical record (EMR) database and a personal health record (PHR) database of the medical institution, wherein the digital therapeutics management system is interworked with the medical institution terminal and the user terminal through at least one of an application service and an IoT-enabled web service.

7. The digital therapeutics management system according to claim 1, wherein the application service provides a user interface for scheduling medical appointments, processing medical payments, and accessing test results, integrated with the prescription information.

8. The digital therapeutics management system according to claim 1, further comprising the list providing processor configured to:
collect numerical values of evaluation information on each of a plurality of digital therapeutics stored in the electronic medical record (EMR) database from the medical staff, wherein the evaluation information is digitized in a preset format;
perform an evaluation on the each of the plurality of digital therapeutics by averaging the collected numerical values; and
extract at least one of the second digital therapeutics list and the third digital therapeutics list by excluding digital therapeutics having an averaged numerical value equal to or less than a preset threshold score.

9. The method of operating the digital therapeutics management system according to claim 6, further comprising:

providing, by the application service, a user interface for scheduling medical appointments, processing medical payments, and accessing test results, wherein the user interface is integrated with the prescription information.

10. The method of operating the digital therapeutics management system according to claim 6, further comprising:
- collecting, by the list providing processor, numerical values of evaluation information on each of a plurality of digital therapeutics stored in the electronic medical record (EMR) database from the medical staff, wherein the evaluation information is digitized in a preset format;
- performing, by the list providing processor, an evaluation on the each of the plurality of digital therapeutics by averaging the collected numerical values; and
- extracting, by the list providing processor, at least one of the second digital therapeutics list and the third digital therapeutics list by excluding digital therapeutics having an averaged numerical value equal to or less than a preset threshold score.

11. The digital therapeutics management system according to claim 1, further comprising the list providing processor configured to analyze the received unstructured text data to extract terms representing a chief complaint as the feature data.

12. The method of operating the digital therapeutics management system according to claim 6, further comprising analyzing, by the list providing processor, the received unstructured text data to extract terms representing a chief complaint as the feature data.

13. The digital therapeutics management system according to claim 1, wherein the medical data includes at least one of symptom information, test result data, and pathological history data of the user monitored by the medical institution.

14. The method of operating the digital therapeutics management system according to claim 6, wherein the medical data includes at least one of symptom information, test result data, and pathological history data of the user monitored by the medical institution.

15. The digital therapeutics management system according to claim 1, wherein the prescription history big data includes the prescription history information of the medical institution and of a plurality of medical institutions interworked with the digital therapeutic management system.

16. The method of operating the digital therapeutics management system according to claim 6, wherein the prescription history big data includes the prescription history information of the medical institution and of a plurality of medical institutions interworked with the digital therapeutic management system.

* * * * *